US011432570B2

(12) United States Patent
Neto et al.

(10) Patent No.: US 11,432,570 B2
(45) Date of Patent: Sep. 6, 2022

(54) METHOD FOR PRODUCING AN EXTRUDED FEED CONTAINING FIBRES

(71) Applicant: Alberto Samaia Neto, Sao Paulo (BR)

(72) Inventors: Alberto Samaia Neto, Sao Paulo (BR); Rodrigo Anselmo Pereira Do Nascimento, Patos de Minas-MG (BR)

(*) Notice: Subject to any disclaimer, the term of this patent is extended or adjusted under 35 U.S.C. 154(b) by 148 days.

(21) Appl. No.: 15/777,239

(22) PCT Filed: Nov. 16, 2016

(86) PCT No.: PCT/BR2016/050297
§ 371 (c)(1),
(2) Date: May 18, 2018

(87) PCT Pub. No.: WO2017/083948
PCT Pub. Date: May 26, 2017

(65) Prior Publication Data
US 2018/0325144 A1 Nov. 15, 2018

(30) Foreign Application Priority Data
Nov. 18, 2015 (BR) .......................... 1020150288816

(51) Int. Cl.
| A23K 40/25 | (2016.01) |
| A23K 10/30 | (2016.01) |
| A23K 50/20 | (2016.01) |
| A23K 50/10 | (2016.01) |
| A23K 10/18 | (2016.01) |
| A23K 20/195 | (2016.01) |
| A23K 10/33 | (2016.01) |
| A23K 10/37 | (2016.01) |
| A23K 20/24 | (2016.01) |
| A23K 20/10 | (2016.01) |

(52) U.S. Cl.
CPC .............. *A23K 40/25* (2016.05); *A23K 10/18* (2016.05); *A23K 10/30* (2016.05); *A23K 10/33* (2016.05); *A23K 10/37* (2016.05); *A23K 20/10* (2016.05); *A23K 20/195* (2016.05); *A23K 20/24* (2016.05); *A23K 50/10* (2016.05); *A23K 50/20* (2016.05); *Y02P 60/87* (2015.11)

(58) Field of Classification Search
CPC ........ A23K 10/18; A23K 10/38; A23K 50/20; A23K 20/10; A23K 40/25; A23K 10/33; A23K 50/15; A23K 10/32; A23K 20/195; A23K 10/37; A23K 50/10; A23K 10/30; A23K 20/24; Y02P 60/877
USPC ...................................................... 426/636
See application file for complete search history.

(56) References Cited

U.S. PATENT DOCUMENTS

| 2,722,385 | A | * | 11/1955 | Rosenbaum | .............. B02C 9/00 241/8 |
| 3,642,489 | A | | 2/1972 | Bartley et al. | |
| 3,796,809 | A | * | 3/1974 | Miller et al. | ........... A23K 50/15 426/2 |
| 3,908,020 | A | * | 9/1975 | Schroeder | .............. A23K 10/30 426/2 |
| 4,112,122 | A | * | 9/1978 | Long | ...................... A21D 2/145 426/19 |
| 4,181,747 | A | * | 1/1980 | Kickle | ..................... A21D 2/36 426/431 |
| 4,381,780 | A | * | 5/1983 | Holloway | ........... A61M 31/002 424/438 |
| 5,540,932 | A | | 7/1996 | Lanter et al. | |
| 5,683,739 | A | | 11/1997 | Lanter et al. | |
| 5,744,186 | A | * | 4/1998 | Harrison | ................. A23K 40/25 426/516 |
| 2003/0152689 | A1 | * | 8/2003 | Ethington, Jr. | ........ A23K 40/20 426/635 |
| 2003/0170371 | A1 | * | 9/2003 | Jobe | ........................ A23K 40/20 426/635 |
| 2008/0146520 | A1 | * | 6/2008 | Block | .................. A23K 20/105 514/54 |
| 2008/0220125 | A1 | * | 9/2008 | Abbas | ...................... D21C 3/02 426/53 |
| 2010/0233321 | A1 | * | 9/2010 | Drouillard | ............. A23K 40/20 426/72 |
| 2014/0259895 | A1 | * | 9/2014 | Mason | ..................... C10L 5/44 44/589 |

FOREIGN PATENT DOCUMENTS

| BR | PI0621720 | 12/2011 | | |
| BR | PI0621721 | 12/2011 | | |
| CN | 102919564 | 2/2013 | | |
| EP | 0068556 A1 | * 1/1983 | ............ A23L 25/30 | |

(Continued)

OTHER PUBLICATIONS

NPL White salt: Retrieved on Jul. 29, 2019. (Year: 2019).*
NPL Bed dryer [Retrieved on Sep. 16, 2020]. (Year: 2020).*

*Primary Examiner* — Erik Kashnikow
*Assistant Examiner* — Bhaskar Mukhopadhyay
(74) *Attorney, Agent, or Firm* — Defillo & Associates, Inc.; Evelyn A. Defillo

(57) ABSTRACT

A process for obtaining extruded animal feed including fibers, especially sugar cane and corn straws, applied in the agricultural and cattle-raising field for the nutrition of ruminants, contributing for higher productive performance (meat or milk) than conventional animal feeds, making use of the non-used sources of fibers for that purpose, with extruded characteristics, as well as for equines, wherein the process follows exactly the same procedure as shown by the patent application, but without the mixture of urea and additives.

1 Claim, No Drawings

(56) References Cited

FOREIGN PATENT DOCUMENTS

| | | | |
|---|---|---|---|
| EP | 0241400 A2 * | 10/1987 | ........... C07C 51/412 |
| GB | 2406516 | 4/2005 | |
| GB | 2490530 | 11/2012 | |
| WO | WO2014130003 | 8/2014 | |
| WO | WO2015196267 | 12/2015 | |

* cited by examiner

METHOD FOR PRODUCING AN EXTRUDED FEED CONTAINING FIBRES

CROSS REFERENCE TO RELATED APPLICATION

This application is a national stage entry of PCT/BR2016/050297 filed Nov. 16, 2016, under the International Convention claiming priority over Brazilian Patent Application No. BR 10 2015 028881 6 filed Nov. 18, 2015.

FIELD OF THE INVENTION

The present patent application refers to a process for obtaining extruded animal feed including fibers, especially sugar cane and corn haystacks, as applied in the agricultural and cattle-raising fields for the nutrition of ruminants and equines.

STATE OF THE ART

The use of fibers as wheat and corn straw in compositions and formulations of animal feed for ruminants is known in the state of the art. However, animal feeds known as using sugar cane and corn straw in their composition do not have an extruded origin.

As can be shown by the patent document BR 0621720-6, dated Oct. 2, 2006, an animal feed composition for bovines or similar is disclosed, particularly animal feed for fattening, containing, besides conventional constituents, sorghum and straw, especially wheat straw, in substitution to corn, alfalfa and hay.

In opposition to the patent document as mentioned above, the invention as now claimed discloses a process for obtaining extruded animal feed, using, as fibers, sugar cane and corn haystack.

The extrusion process as used for obtaining animal feed, especially for ruminants, is also known in the state of the art, as can be proven by the U.S. Pat. No. 5,540,932, dated Apr. 13, 1995, and U.S. Pat. No. 5,683,739, dated Jul. 11, 1996, but it is important to highlight that the extrusion is not combined with materials such as haystacks.

As known, extruded feed is a food which is processed under high temperature, pressure, dragging force and for a short period of time, followed by an abrupt change in pressure, making it become much more useful for animals.

Extrusion is very effective to improve the nutritional value of food of vegetal origin, since nutrients in them are found within cells involved by a layer of a low digestibility material (cellulose, hemicellulose, lignin), making the access of the digestive enzymes to them become difficult.

Therefore, with the object to reach an extruded feed which, besides energy, protein and minerals, also has a readily available source of fibers, based on haystack, preferably from sugar cane and corn, the present process has been developed.

By means of this process, it has been possible to reach animal feed for ruminants and equines having a productive performance (meat or milk) above conventional feeds, by making use of sources of fiber not used for that purpose.

OBJECT OF THE INVENTION

The object of the present patent application is to disclose a process for obtaining extruded animal feed, including fibers, especially sugar cane and corn haystacks, for the nutrition of ruminants, contributing to higher production performance (meat or milk) than conventional feed, by making use of such sources of fiber which are not used for this purpose, with extruded characteristics, considering that extrusion is very effective to improve the nutritional value of food of vegetal origin, since nutrients are included therein inside the cell involved by a layer of a low digestibility material (cellulose, hemicellulose, lignin), making the access of digestive enzymes to them become difficult.

Another object of the patent application at issue is a process for obtaining animal feed for equines, which process follows exactly the same procedure as shown by the patent application, but with no mixture of urea and additives.

DETAILED DESCRIPTION OF THE INVENTION

The present patent application discloses a process for obtaining extruded animal feed, including fibers, especially sugar cane and corn haystacks, for the nutrition of ruminants and equines.

The process for obtaining extruded animal feed comprises the following steps:

Treatment of Straw

Dry straw receives the application of an antifungal (active principle: ammonium dipropionate or similar) in the bundling process, under dose of 0.5 liters/ton of straw, by using a commercial product.

Pre-Milling

Harvested and treated straw is chopped in a rotating drum chopper into 5-10 cm particles.

Milling

The straw is milled in a rotating drum chopper with 4 knives, being reduced to average particles lower than 6 mm.

Dosage

The dosage of macro products is performed on scales, according to the proposed formulation.

The following macro products are used:
corn and/or sorghum, 40-70% by weight;
soy bran and/or sunflower bran and/or cotton bran, 1-4% by weight; and
at least one source of fiber, which may be pre-chopped sugar cane straw or corn straw, 15-50% by weight.

Weighing

According to the proposed formulations, dosage is performed on scales with capacity for 1,000-2,000 kg; wherein the quantity of each product is controlled by the pre-defined weight.

Mixture

After weighing the macro products, these are delivered to a horizontal helical 3-stage mixer, into which the micro products are inserted, and the mixing process subsequently starts with a pre-set time of 1 to 5 minutes, depending on the formulation.

The following micro products are used for the nutrition of ruminants:

urea for cattle raising, 0.01-3% by weight;
potassium chloride for cattle raising;
limestone;
calcium sulfide;
dicalcium phosphate;
potassium;
monensin;
virginiamycin;
yeast;
white salt;
molasses;
powdered milk; and
ready formulations: 0.2-6% by weight each.

For the nutrition of equines, no micro products are used.

Milling

After the mixture, the product passes through a hammer mill, with a 1.5-2.0 mm screen. This is the last milling step before the extrusion process.

Extrusion

It consists of steam and pressure cooking the product after fine milling, wherein the product characteristics are changed after this procedure.

At the end of the extrusion process, according to each formulation and purpose of use, a grain size is established, and the following matrixes may be used:
6 mm diameter;
8 mm diameter; or
10 mm diameter.

Drying

After the extrusion process, the product is collected with humidity varying between 18 and 26%, and drying is required by using a steam (vertical or horizontal) drier. After drying, humidity will vary between 4% and 12%.

Cooling

Despite the product leaves the drier under ideal humidity for storage, its temperature is above the room temperature, and cooling is required before the bagging process, so to avoid product transpiration inside the bags, which would form a favorable environment for fungus development.

Said cooling is performed by using a (vertical or horizontal) cooler with cold air jets.

Bagging

After cooling, the product is transported to bagging silos or carried bulk.

For the bagged product, raffia bags are used (laminated or not), measuring 60×100 cm and 65×100 cm with capacity for 25 kg each.

The invention claimed is:

1. A process to obtain extruded animal feed, the process consisting of the following steps:
   treating a harvested sorghum dry straw with an antifungal including ammonium dipropionate;
   pre-milling the harvested sorghum dry straw from the previous step to a particle size of 5-10 cm;
   milling the pre-milled treated harvested sorghum dry straw from the previous step to a particle size lower than 6 mm;
   milling sugar cane as a fiber source to a particle size lower than 6 mm;
   preparing a dry mixture by mixing:
   wherein the dry mixture consisting of:
   the milled treated harvested sorghum dry straw, 40-70% by weight;
   at least one of sunflower bran and cotton bran, 1-4% by weight; and
   the milled sugar cane, as the fiber source, 15-50% by weight; weighing the mixture to a pre-set weight;
   adding to the dry mixture:
   urea 0.01-3% by weight, and
   at least one of potassium chloride, limestone, calcium sulfate, dicalcium phosphate, potassium, monensin, virginiamycin, yeast, white salt, molasses, powdered milk, or ready formulations under the ratio of 0.2-6% by weight;
   milling the dry mixture from the previous step in a hammer mill having a 1.5-2.0 mm screen;
   steaming and pressure cooking the mixture of the previous step;
   extruding the mixture of the previous step;
   determining a particle size of the extruded mixture;
   drying the extruded mixture of the previous step until a humidity between 4% and 12%; and
   cooling the mixture of the previous step with cold air jets.

* * * * *